(12) United States Patent
Jorjadze et al.

(10) Patent No.: US 11,242,605 B1
(45) Date of Patent: Feb. 8, 2022

(54) SYSTEMS AND METHODS FOR SEPARATING AND EXTRACTING METALS

(71) Applicants: Vasily Jorjadze, Shoreham, NY (US); David Gelenidze, Tbilisi (GE)

(72) Inventors: Vasily Jorjadze, Shoreham, NY (US); David Gelenidze, Tbilisi (GE)

( * ) Notice: Subject to any disclaimer, the term of this patent is extended or adjusted under 35 U.S.C. 154(b) by 0 days.

(21) Appl. No.: 17/174,545

(22) Filed: Feb. 12, 2021

Related U.S. Application Data

(63) Continuation-in-part of application No. 16/813,088, filed on Mar. 9, 2020, now Pat. No. 10,948,234.

(51) Int. Cl.
| | |
|---|---|
| C25C 3/34 | (2006.01) |
| C25C 7/06 | (2006.01) |
| C25C 7/02 | (2006.01) |
| C22B 61/00 | (2006.01) |

(52) U.S. Cl.
CPC ............. C25C 3/34 (2013.01); C22B 61/00 (2013.01); C25C 7/025 (2013.01); C25C 7/06 (2013.01)

(58) Field of Classification Search
CPC ................................. F27B 3/085; H05B 7/10
USPC .... 373/134, 155, 88, 60, 61, 62, 63, 66, 71, 373/72, 102, 104, 116, 118, 119, 120, 373/122; 219/50, 649; 425/78, 77; 257/467, 419, 466, 522, 528, 619; 428/213, 220, 245, 332, 336, 364, 368, 428/378; 426/447.3, 445; 338/279
See application file for complete search history.

(56) References Cited

U.S. PATENT DOCUMENTS

| | | | | |
|---|---|---|---|---|
| 3,449,117 A | * | 6/1969 | Jack | C22B 19/00 75/10.31 |
| 3,670,257 A | * | 6/1972 | McMahan | H01S 3/041 372/33 |
| 4,148,964 A | * | 4/1979 | Fedoseev | C04B 35/5831 264/332 |
| 4,153,449 A | * | 5/1979 | Greenewald, Jr. | F27B 3/085 420/583 |
| 4,175,022 A | * | 11/1979 | Vadla | C25C 3/085 204/247.4 |
| 4,247,755 A | * | 1/1981 | Smith, Jr. | B01J 3/04 219/400 |
| 4,292,276 A | * | 9/1981 | Enomoto | C01B 32/97 422/199 |
| 4,366,571 A | * | 12/1982 | Palmquist | C03B 5/425 373/30 |
| 4,888,242 A | * | 12/1989 | Matsuo | B32B 3/28 428/408 |
| 2007/0284259 A1 | * | 12/2007 | MacLeod | C25C 3/06 205/390 |
| 2014/0318312 A1 | * | 10/2014 | Deegan | C22B 4/005 75/10.19 |

(Continued)

OTHER PUBLICATIONS

Block; "Preparation of Yttrium and Rare-Earth Metals by Metallothermic Reduction"; PhD Thesis; Jun. 1964; Oregon State University; Corvallis, Oregon.

(Continued)

*Primary Examiner* — Tu B Hoang
*Assistant Examiner* — Vy T Nguyen

(57) ABSTRACT

In a system and method for separating metals from a substance comprising them, a system may comprise a constant current power supply and a furnace having a chamber for containing the substance. The furnace may comprise an insulating outer section, a chamber wall, and two electrodes.

24 Claims, 8 Drawing Sheets

(56) References Cited

U.S. PATENT DOCUMENTS

2017/0275732 A1  9/2017  Brewer

OTHER PUBLICATIONS

"Rare Earth Elements: A Review of Production, Processing, Recycling, and Associated Environmental Issues" EPA/600/R-12/572; Dec. 2012; Engineering Technical Support Center, Land Remediation and Pollution Control Division, National Risk Management Research Laboratory, Office of Research and Development; Cincinnati, OH.

* cited by examiner

SYSTEMS AND METHODS FOR SEPARATING AND EXTRACTING METALS

This U.S. patent application is a Continuation-In-Part from U.S. patent application Ser. No. 16/813,088 filed on Mar. 24, 2020 entitled "System and Method for Heating Materials", which is a Divisional of U.S. patent application Ser. No. 15/433,367 entitled "System and Method for Heating Materials" filed on Jun. 6, 2019, the disclosures of which are incorporated by reference in their entirety.

BACKGROUND

Methods for extracting and separating metals such as iron and gold from ores and other substances have existed for thousands of years. More recently, the discovery and use in electronics, magnets, some alloys, and other new technologies of rare earth elements (REEs), specifically the fourteen lanthanides, scandium, and yttrium, have generated increasing interest in processes for obtaining these elements. Along with gold, silver, platinum and palladium, these metals are collectively referred to as precious metals.

Although precious metals can be separated from enriched sources such as ores and brines, the product of such separations is a mixed oxide substance that requires further extraction into individual metals. For example, the extraction of the mixed oxides into individual REEs has generally been carried out using solvent extraction, an expensive and environmentally damaging technology. Production of one ton of REEs can generate on the order of 2,000 tons of very toxic waste material. The massive amount of toxic waste produced at REE and other precious metal mine operations represents a serious issue in applying this technology to precious metal separation and extraction. The only significant source of REEs in the United States, the Mountain Pass mine in California, has had its operations substantially hampered because of environmental problems as well as other market factors. This has left the US dependent primarily on foreign sources for REEs.

Therefore, there remains a need for an environmentally friendly system and process for efficient separation and extraction of precious and other metals from ores and other substances containing them.

SUMMARY OF THE INVENTION

The present inventive subject matter is directed to systems and methods for metallothermically separating and extracting metals from substances that contain them. A circuit may comprise a constant current power supply electrically coupled to a furnace. By applying a constant current to the furnace, the temperature inside the furnace may be raised high enough to melt or boil precious and other metals. The system may also include a condensation unit attached to the furnace for collecting vaporized precious and other metals and a venting tube connecting the furnace to the condensation unit. Alternatively, the system may comprise two separate power supply and furnace circuits with a first circuit configured to separate metals from the substances containing them possibly yielding a mischmetal, and a second circuit configured to extract metals from a mischmetal or other substance comprising metals. Additionally, if more than one metal is present, the power supply may be configured to raise the temperature inside the chamber to two or more levels and hold the temperature at each level to vaporize each metal substantially and individually.

Further objects, features, and advantages will be apparent from the following detailed description and taking into consideration the attached drawing figures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanied drawings in which:

Figure 1:
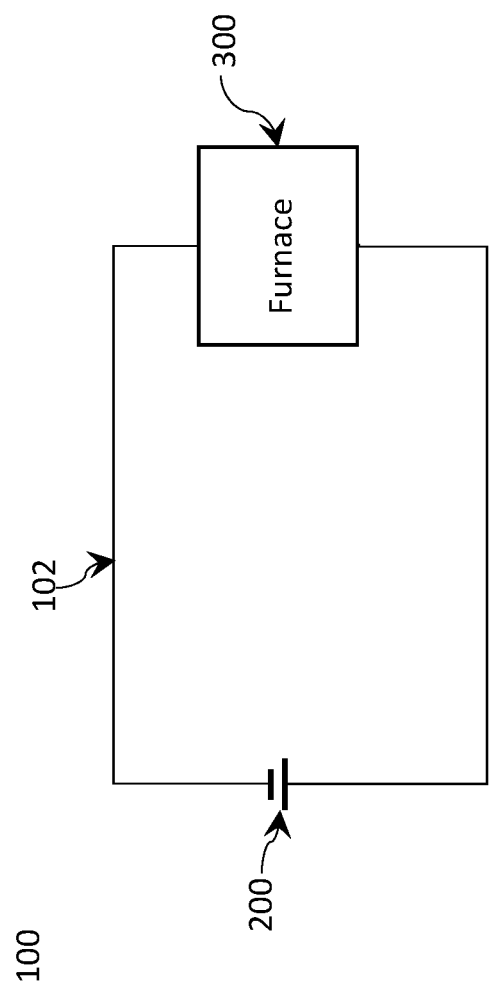
FIG. 1 is a circuit diagram of a system according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing the term REE refers to one of the following fourteen lanthanide elements—lanthanum, cerium, praseodymium, neodymium, samarium, europium, gadolinium, terbium, dysprosium, holmium, erbium, thulium, ytterbium, lutetium—as well as scandium and yttrium. For practical purposes, promethium may not be considered because it is produced only in nuclear reactions and is extremely rare. Furthermore, the term precious metals refers to these metals as well as gold, silver, platinum, and palladium.

Unless specifically stated otherwise, ores are naturally occurring solid substance or material from which one or more metals or valuable minerals can be extracted. Some REE containing ores are monazite, xenotime and bastnaesite. Furthermore, brines are used herein to mean water saturated or strongly impregnated with salts, which may contain minerals and metals including REEs. Other substances containing REEs and other precious metals include, but are not limited to, industrial products for recycling such as computer memories, monitors, REE containing magnets, fluorescent light bulb powder; tailings of coal production processes and coal combustion products such as coal fly ash which may contain enhanced amounts of REEs; and remains of the fertilizer production from phosphate rock which also may contain a higher content of REEs than natural ores. Some or all of these substances and others may be considered herein as input substances containing or comprising desired metals for the presently described invention.

For some embodiments of the present invention, these or other input substances containing or comprising desired metals may have undergone a beneficiation process for enriching the precious or other metal content from, for example, low parts per million to a much higher concentration. Such a process may involve various mechanical processes including but not limited to grinding, milling, froth flotation, gravity separation, magnet and electrostatic separation techniques. A chemical enriching process may also be employed.

For embodiments in which REEs may be extracted specifically from natural ores that comprise gangue in addition to the REEs, beneficiation may be mechanical or chemical and may also include a process for removing gangue through a metallothermic process whereby the substances comprising REEs may be heated to a temperature of, for example, 1500° C. or similar temperature above the boiling temperature of the remaining or unwanted components of the gangue, thereby vaporizing these components. This heating may be accomplished with an additional embodiment of the present invention or other heating system.

In some preferred embodiments, other substances may be combined with or added to the input substances containing or comprising desired metals to facilitate the separation or extraction process. Determining the amount of additive may consider the chemical composition of the metal oxides in the metal containing substances, the quantity of metal containing substances, the concentration of metal oxides, and other characteristics as known in the art. For example, a stoichiometrically determined amount of coke comprising approximately 99% or more carbon may be added to induce a reduction of metal oxides into metals with carbon dioxide ($CO_2$) and possibly carbon monoxide (CO) as byproducts of such a reaction. Other reducing agents such as hydrogen ($H_2$) and metals such as lithium (Li), sodium (Na), potassium (K), magnesium (Mg), calcium (Ca) or aluminum (Al) alone or in combination may be used for REE reduction from their oxides, and lanthanum (La) may be used for heavy REE (europium and higher atomic number REEs) reduction from their oxides.

The term mischmetal as used herein is an alloy or other product of a high temperature heat processing of an ore or other substance containing REEs or other precious metals. The mischmetal may comprise one or more REEs and may also include iron or one or more other precious metals.

As used herein, separation is a process by which one or more metals may be removed from an ore, brine, industrial product designated for recycling, remains of fertilization production, and other substances. Furthermore, extraction is used to mean a process by which a desired metal is isolated from a mischmetal or other metal containing material.

As described herein, a furnace is a heating device having an internal chamber and connected to an electric power supply to which one or more substances comprising metals are delivered by batch, conveyor, or other method and configured to achieve operating temperatures to melt or boil desired metals. By adjusting the voltage and current of the electricity applied to the furnace, the temperature inside the furnace can be controlled and set to a specific desired level. Alternatively, such a device may also be referred to as a reactor. The term operating temperature of a furnace refers to the temperature level substantially throughout the chamber of the furnace, as opposed to a concentrated or localized temperature such that achieved in the arc of a plasma arc furnace.

The term constant current power supply is a power supply configured to produce a current whose magnitude variation is substantially limited, i.e., constant over a range of voltages and for which the short circuit current is sufficiently limited to avoid damage to the power supply. The current and voltage levels may be configurable for different operating conditions of the furnace. Furthermore, a constant current power supply may supply either a direct current or an alternating current depending on the configurations or embodiments of the invention. In some instances for which the power supply provides an alternating current, the frequency of the alternating current may be adjustable as well. In some instances of the present invention, a constant alternating current may be preferable over a direct current, as an alternating current may provide additional heating of conductive substances by induction.

In a first illustrative embodiment, a system may comprise a constant current power supply electrically connected to a furnace. The furnace may comprise a chamber for containing substances comprising one or more metals, an insulating outer section or layer, a chamber wall electrically and thermally conductive for resistively heating the chamber in the presence of an electric current flowing through the chamber wall, and two electrodes electrically coupled to the constant current power supply and electrically and thermally coupled to the chamber wall. The chamber wall and the two electrodes may each have a melting temperature higher than a highest melting temperature of the one or more metals and may sustain microplasma discharges internally to the material of the chamber wall and two electrodes in the presence of an electric current supplied by the constant current power supply. The constant current power supply may be configured to produce a current of constant magnitude over a range of voltage and having a short circuit current, and for which the short circuit current is sufficiently limited to avoid damage to the power supply. The constant current power supply may be configured to provide sufficient power to achieve an operating temperature above a highest melting temperature of the one or more metals inside the chamber and for sufficient duration to melt substantially all of the one or more metals inside the chamber. In some instances, the first illustrative embodiment may be further comprise a condensation unit attached to the chamber wall for condensing and collecting the one or more metals in vaporized gas form, a venting tube connecting the furnace chamber to the inside of the condensation unit, and the constant current power supply may be further configured to provide sufficient power for sufficient duration to vaporize substantially all of the one or more metals inside the chamber. In those instances, the condensation unit may further comprise a condensation chamber inside the condensation unit, an inert gas purging system, a liquid cooling system, and a collection device for collecting condensed metals attached to the condensation chamber.

A second illustrative embodiment may include placing a material comprising one or more metals inside a chamber of a furnace, the furnace comprising a chamber for containing the substances comprising one or more metals, an insulating outer section or layer, a chamber wall electrically and thermally conductive for resistively heating the chamber in the presence of the electric current when flowing through the chamber wall, and two electrodes electrically and thermally connected to the chamber wall. The embodiment may further include supplying an electric current from a constant current power supply electrically coupled to the two electrodes of the furnace. The chamber wall and the two electrodes may each have a melting temperature higher than a highest melting temperature of the one or more metals and may sustaining microplasma discharges internally to the material of the chamber wall and the two electrodes in the presence of an electric current supplied by the constant current power supply. The constant current power supply may be configured to produce a current of constant magnitude over a range of voltage, and having a short circuit current, and for which the short circuit current is sufficiently limited to avoid damage to the power supply, and further configured to provide power at a power level sufficient to raise an operating temperature inside the chamber above a highest melting temperature of the one or more metals and for sufficient duration to melt substantially all of the one or more metals inside the chamber.

A third illustrative embodiment may include placing a material comprising two or more metals inside a chamber of a furnace, the furnace comprising an insulating outer section or layer, a chamber wall electrically and thermally conductive for resistively heating the chamber in the presence of the electric current when flowing through the furnace chamber wall, two electrodes electrically and thermally connected to the furnace chamber wall, a condensation unit for condensing and collecting vaporized metals, the condensation unit comprising a condensation chamber, an inert gas purging system, a liquid cooling system, and a collection device for collecting condensed metals attached to the condensation chamber, and a venting tube connecting the furnace chamber to the condensation chamber of the condensation unit. The embodiment may further include a constant current power supply electrically coupled to the two electrodes of the furnace. The furnace chamber wall and the two electrodes may each have a melting temperature higher than a highest melting temperature of the two or more metals and may sustain microplasma discharges internally to the material of the furnace chamber wall and two electrodes in the presence of an electric current supplied by the constant current power supply. The constant current power supply may be configured to produce a current of constant magnitude over a range of voltage, and having a short circuit current, and for which the short circuit current is sufficiently limited to avoid damage to the power supply. The illustrative embodiment may further include purging air from the furnace chamber, supplying an electric current from the constant current power supply, the current supplied at a power level sufficient to achieve an operating temperature inside the furnace chamber that is an intermediate temperature above a boiling temperature or boiling point of a first metal to be collected and for sufficient duration to vaporize substantially all of the first metal, the first metal having a lowest boiling temperature of the two or more metals, and collecting the vaporized first metal in the collection device of the condensation unit.

For all of these embodiments, an alternating current constant current power supply, as opposed to a direct current constant current power supply, may be used to cause additional inductive heating of conductive substances placed inside the chamber of the furnace.

Furthermore, for all of these embodiments, the assembly of the chamber wall and two electrodes, made of the same material, namely graphite, mechanically, electrically, and thermally connected to each other may function as a single integrated unit or reactor, where current flow throughout the material of the electrodes and chamber wall provides uniform heating of the interior of the chamber.

Table 1 presents the melting and boiling points of rare earth and other precious metals. As can be seen in the table, the highest melting points of these metals are below the lowest boiling points of any of these metals except the boiling points of europium and ytterbium. Some embodiments of the present invention capitalize on this phenomenon first to separate metals from substances containing them by melting them into a mischmetal that is removed from residual material and subsequently raising the temperature of the mischmetal to a temperature between the lowest boiling temperature of a first metal to be extracted and the next lowest boiling temperature of the remaining metals present in the mischmetal, causing the first metal to vaporize and allowing it to pass into a cooling or condensation device to condense and be collected.

As used herein, an intermediate temperature is a temperature between the consecutive boiling temperatures of two precious metals present in a mischmetal or other material when ranked from lowest boiling temperature to the highest boiling temperature. For example, an intermediate temperature between the boiling points of erbium and yttrium when both are present would be in the range from 2868° C. to 2930° C., and an intermediate temperature between the boiling points of samarium and thulium would be in the range from 1900° C. to 1950° C. Furthermore, in the presence of scandium and yttrium with no erbium present, an intermediate temperature would be in the range from 2836° C. to 2930° C.

For remaining metals to be extracted, the temperature of the mischmetal may be raised to the next lowest intermediate temperature for extraction of the next metal to be extracted. The process may continue sequentially for all remaining metals to be extracted with the last temperature being above the boiling point of the last remaining metal to be extracted from the mischmetal, assuming no other undesired metals with higher boiling points are present.

In the case of a single desired metal being present in the substance containing it, the initial separation by melting may result in adequate purity. Alternatively, boiling may be required to eliminate impurities.

TABLE 1

Melting and Boiling Temperatures of Precious Metals

| Metal | Melting Temp, ° C. | Boiling Temp, ° C. | Metal | Melting Temp, ° C. | Boiling Temp, ° C. |
| --- | --- | --- | --- | --- | --- |
| Lanthanum (La) | 920 | 3464 | Erbium (Er) | 1529 | 2868 |
| Cerium (Ce) | 795 | 3443 | Thulium (Tm) | 1545 | 1950 |

TABLE 1-continued

Melting and Boiling Temperatures of Precious Metals

| Metal | Melting Temp, ° C. | Boiling Temp, ° C. | Metal | Melting Temp, ° C. | Boiling Temp, ° C. |
| --- | --- | --- | --- | --- | --- |
| Praseodymium (Pr) | 935 | 3130 | Ytterbium (Yb) | 824 | 1196 |
| Neodymium (Nd) | 1024 | 3074 | Lutetium (Lu) | 1652 | 3402 |
| Samarium (Sm) | 1072 | 1900 | Scandium (Sc) | 1541 | 2836 |
| Europium (Eu) | 826 | 1529 | Yttrium (Y) | 1526 | 2930 |
| Gadolinium (Gd) | 1312 | 3000 | Gold (Au) | 1064 | 2970 |
| Terbium (Tb) | 1356 | 3123 | Silver (Ag) | 962 | 2162 |
| Dysprosium (Dy) | 1407 | 2562 | Palladium (Pd) | 1555 | 2963 |
| Holmium (Ho) | 1461 | 2600 | Platinum (Pt) | 1768 | 3825 |

For some preferred embodiments, if the chamber walls and electrodes of a furnace are fabricated from graphite, for example, the transmission of a high current-through the electrodes and chamber walls may induce formation of and sustain microplasma discharges internally to the material of the electrodes and chamber walls, which will, in turn, cause resistive or Joule heating. It is an advantage of the present invention that the heat so generated may be transferred to substances inside the furnace in three ways: first by radiation through empty spaces that may exist inside the chamber, second conductively through contact between the substances and the chamber walls, and third through convection when some or all of the material inside the furnace is either in a liquid or gaseous state. No additional heating sources are required for operation such as needed, for example, when using a crucible to contain substances to be exposed to high temperatures. Furthermore, in some embodiments for which the constant current power supply provides alternating current, the current and magnetic field alternations may generate inductive heating of any conductive substances inside the furnace further enhancing the heating capacity of the furnace.

These multiple heat transfer mechanisms and resistive heating from substantially the entire chamber wall may enable more uniform and efficient heating throughout the chamber than for other furnace technologies such as, for example, electric arc or plasma torch furnaces. Moreover, the stability of the current produced by the constant current power supply may eliminate variations in current density that can cause damage or erode the lifetime of certain components of other furnace technologies which may rely on constant voltage power supplies, while the distributed current flow from the electrodes throughout the chamber walls may eliminate the need for cooling the electrodes that may concentrate electron flow for example through a pointed tip or cooling other parts of a furnace to prevent erosion or other damage. Thus, it is an advantage of the present invention that no cooling system is required for furnace operation thereby significantly increasing the energy efficiency of the current invention, Changing the output current and voltage of the power supply may raise or lower the temperature reached inside the furnace as needed to achieve the different metals' melting and boiling temperatures, while variations in the design of the furnace may serve to improve separation or extraction of metals by either melting or boiling.

The power supply may be configured for a smooth temperature variation, with time delay, enabling a controlled melting of extractable precious metals with melting points in a temperature range of at least 795° C. to 1652° C. This range of temperatures is below the melting temperature of some ores and other substances that may contain metals of interest. For example, the predominant component in many ore deposits of REEs may be silicon dioxide, chemically $SiO_2$, having a melting temperature of 1713° C.

Such a furnace may further include one or more condensation units attached on the top of or elsewhere on the surface of the furnace and connected to the furnace chamber by a venting tube or pipe on or near the top of the furnace chamber. The venting tube may also include a valve to isolate the condensation unit from the furnace chamber. The condensation unit may be tapered toward its top end and may include a purge gas system to purge air from the condensation unit and possibly the furnace chamber as well, a cooling system to reduce the temperature of the condensation chamber walls, and a collection plate or other device in the bottom of the condensation unit for collecting metals as they condense in the condensation chamber. To prevent oxidation of metals inside the condensation unit, the purge gas system may use inert gases such as argon or helium. The collection plate or other device may be sealable and sealed in the presence of these inert gases for transfer to other sealed containers under pressure with these inert gases or special liquids for REE storage or shipping. Such devices are known to those skilled in the art and are commercially available.

For extraction of metals, the temperature inside the furnace chamber may be raised to intermediate temperatures sequentially from the lowest to the highest for each metal to be extracted. The metal vapor or gas produced may escape from the furnace chamber through the venting tube and may be cooled down and collected in the condensation chamber. The process of raising the temperature and collecting the metal vapor may continue until all desired metals are individually extracted from the furnace. For embodiments with a single condensation unit, the condensation unit may be isolated from the furnace chamber using the isolation valve of the venting tube while the desired metal is removed from the collection plate. Means for opening the condensation unit to remove the desired metal and/or the collection plate alone may also be provided. Furthermore, means for sealing the collection plate under pressure from an inert gas may also be provided. The isolation valve may be reopened as the furnace temperature exceeds the next highest boiling point. Removal of the contents may, in some instances, take place in a glove box or similar device for preventing contamination by air.

For some embodiments of present invention, the cooling system may comprise a fast-cooling mechanism that may be used for converting evaporated material into a powder during condensation. The particles of this powder may have a nanometer scale size. Nanometer scale powders of precious and non-precious metals are often extremely valuable and difficult to produce by other existing means.

FIG. 1 shows an embodiment of the present metal separation and extraction system. System 100 comprises a circuit 102 including a power supply 200 connected electrically to a furnace 300. Power supply 200 may, for example, comprise an alternating current constant current power supply providing an alternating current at 50 or 60 Hz, although the invention is not limited in this respect. Higher frequencies for the output of power supply 200 may improve microplasma discharge stability and thereby improve the uniformity of heating distribution inside furnace 300. Direct current constant current power supplies may also be employed.

In some embodiments furnace 300 may comprise a furnace for separating metals from a material such as for example an ore that contains one or more metals. In other embodiments furnace 300 may also be used for separating individual metallic elements from a material comprising two or more metallic elements such as a mischmetal although the invention is not limited in this respect. Additionally, the high temperatures achievable with furnace 300 may enable formation of chemical bonds in the substances being heated, the formation of which may not be possible otherwise or as readily at temperatures below those achievable with furnace 300.

Figure 2:
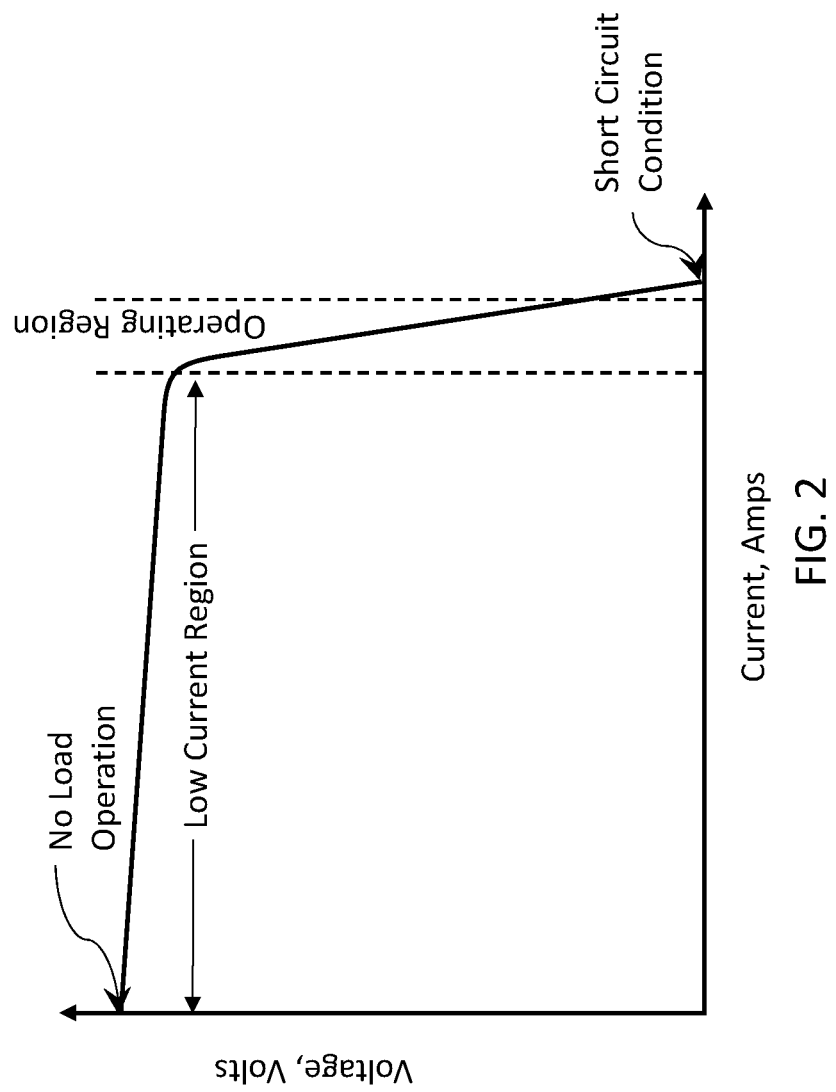
FIG. 2 is a graph showing a representative voltage-current characteristic of a constant current power supply for some embodiments of the invention.

FIG. 2 is a graph that illustrates a representative output voltage-current characteristic of a power supply of the same type as power supply 200 in circuit 102 according to an embodiment of the invention. This constant current power supply provides for stable operation of the system. The shape of the voltage current curve in FIG. 2 is nearly rectangular such that for the low current region bounded on a first edge by the no-load operation voltage with no current flowing and at a second edge at which a small decrease in voltage results in a large increase in current, the voltage decreases slightly with increasing current. In the operating region, the current provided by power supply 200 is relatively constant or steady over a range of decreasing voltages from that at the second edge of the low current region to a low voltage above the zero voltage or the short circuit condition.

A feature of power supply 200 limits the short circuit current to prevent damaging the power supply. For example, in an embodiment of the present invention, the short circuit current is limited to be no more than approximately 20% higher than the current in the operating region, i.e., at a voltage at or near the short circuit voltage. Constant current power supplies with this characteristic are known in the art and are available commercially, for example to be used in the welding industry.

In some embodiments of the present invention, the voltage and current required for proper operation of the invention may vary according to the melting and boiling points of the metallic element or elements to be extracted from the material comprising them or according to the energy requirements of a desired chemical reaction such as for example a reduction reaction. A higher melting or boiling point for one metal may require a higher operating current and operating voltage than another metal with a lower melting or boiling point. In addition, the voltage and current required for proper operation of the invention may vary according to the construction, capacity, load, and function of furnace 300. Furthermore, power supply 200 may generate a constant high operating current at a relatively low operating voltage. The combination of high current and low voltage has been used previously, for example, in the production of carbon nanotubes by plasma synthesis (see Journal of Applied Physics, Volume 95, #4, Feb. 15, 2004 by Hinkov et al.). However, that application and others have utilized electric-arc discharges between carbon electrodes as the primary heating mechanism and not formation of microplasma discharges in graphite structural components of the furnace for resistive heating. In one embodiment of the present invention, power supply 200 may have a no-load operation voltage of 90V, maximum operating voltage of 44V, and an operating voltage range of 20V to 30V for an operating current of 1200 A to 1500 A at a frequency of 60 Hz. The rate of the rise in temperature inside furnace 300 and duration of power supplied by power supply 200 may be adjusted according to the requirements of the process and may, for some embodiments, be determined experimentally, empirically, or may be derived from the properties of the furnace.

Some embodiments of the present invention may utilize parallel connections of several power sources 200 to enhance current flow through the furnace or increase the frequency of an alternating current power source to provide a sudden increase in current or induction power delivery to the material processed. Such a sudden or spike in power delivery may provide a disintegration of certain substances into a metal powder, which may comprise nano-sized particles.

Figure 3:
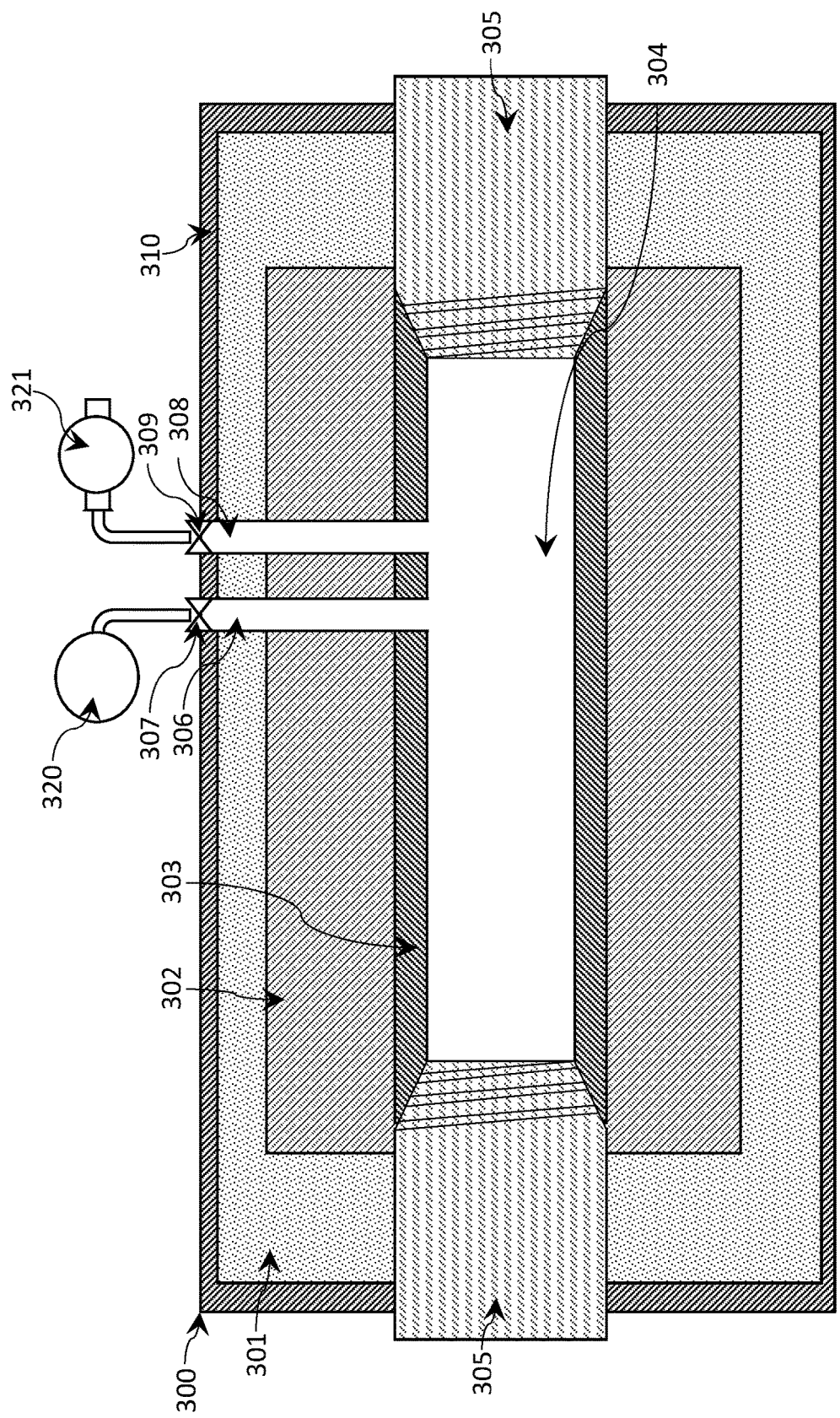
FIG. 3 shows a cross section of a furnace according to an embodiment of the invention.

FIG. 3 shows a cross-section of furnace 300 for some embodiments of the present invention. In the embodiment of FIG. 3, furnace 300 may operate to separate or extract one or more metals or metallic elements from an ore or other substance containing metals. Furnace 300 may be comprised of an insulating outer section 301 that surrounds conducting chamber wall 302, sleeve 303, furnace chamber 304, electrodes 305, inert gas supply tube 306, inert gas supply valve 307, gas discharge tube 308, and gas discharge valve 309, enclosure 310, an inert gas supply 320, and a vacuum pump 321. Additional elements may be included in furnace 300 as needed to accommodate different uses for furnace 300.

Insulating outer section 301 may surround chamber wall 302 and may function to assure enough heat retention without undue thermal losses for the separation or extraction process to occur and may be comprised of one or more insulating materials that thermally insulate chamber wall 302 and furnace chamber 304 from the outside environment. In an embodiment of the present invention, zirconium silicate, chemically $ZrSiO_4$, having a melting temperature between 2100° C. and 2300° C. may be included as one of the ingredients of the insulating material. Zirconium oxide, chemically $ZrO_2$ may also be included as an ingredient of the insulating material. In some embodiments of the present invention, the insulating material may include a mix comprising 25 to 35 percent silicon dioxide ($SiO_2$) and 75 to 65 percent zirconium oxide respectively or in approximately a 1 to 3 or 1 to 2 ratio of silicon dioxide to zirconium oxide along with one or more other materials such that the composition can withstand high temperatures of 2200-2700° C. without degradation or changing states, depending on the relative amounts of $SiO_2$ and $ZrO_2$. Alternatively, for higher temperature applications, some embodiments of insulating outer section 301 may comprise pure zirconium oxide powder having a melting temperature of 2715° C. Other insulating materials or systems may also be used.

Chamber wall 302 forms the shape of furnace chamber 304 according to the function of furnace 300. In a preferred embodiment, the shape of chamber 304 may be cylindrical with chamber wall 302 having an annular cylindrical shape although the invention is not limited in this respect. In another embodiment of the present invention, the shape of chamber wall 302 may define a rectangular parallelepiped. Other such shapes that allow for adequate heat retention and distribution, such as a hollow spherical shape, are also possible. To allow for placement or insertion of substances into furnace chamber 304 and removal of processed substances after operation of furnace 300, chamber wall 302 may be separable into 2 or more mated parts. Alternatively, chamber wall 302 may be a single component configured to allow substances to be physically inserted and removed from furnace chamber 304 through the orifices or apertures in which the electrodes are placed. Alternatively, chamber wall 302 may include a sealable orifice to allow for insertion of material and may include a sump or similar structure for collecting processed substances.

In some embodiments, chamber wall 302 may be wrapped in graphite or carbon felt to retain heat. Such materials having a state change above or near 3000° C., are commercially available.

In some embodiments, chamber wall 302 may be comprised of graphite having an anisotropic structure that may have been formed by a process including isostatic pressure for compaction and or shape forming. For example, the graphite may be extruded, by pressing a fine graphite powder blended with pitch or another binder through a die under pressure. The resulting shape may then be fired, impregnated, fired, and graphitized at a high temperature such as 2000° C.

Alternatively, chamber wall 302 may be comprised of another electrically and thermally conductive material with a state or phase change such as a melting temperature or sublimation temperature higher than the highest operating temperature and pressure of furnace 300 and that can support the formation of microplasma discharges internally with the application of the appropriate voltage and current to electrodes 305. For example, for a cylindrical furnace chamber 304 with a chamber wall 302 having an outer diameter of 24 mm, an inner diameter of 14 mm, a length of 500 mm, and a total graphite mass of 283.5 grams for chamber walls 302 and electrodes 305, an operating voltage of 20V and an alternating current of 1200 amps, 60 Hz will induce the formation of microplasma discharges throughout chamber walls 302 and electrodes 305 thereby causing resistive or joule heating and possibly inductive heating of enough magnitude to raise the temperature inside furnace chamber 304 high enough to melt at least some precious metals such as platinum having a melting temperature of 1768° C. In practice, the highest operating temperature of furnace 300 achieved by an embodiment of the invention has been at least 3422° C., determined by the successful melting of tungsten, although operating temperatures of 3500° C. and higher are also possible.

To prevent materials from sticking to chamber wall 302 during operation of system 100, some embodiments of the present invention may include a sleeve 303 that fits snugly or lines the interior or inside of chamber wall 302 and conforms to the shape of furnace chamber 304. Sleeve 303 may consist of a nonstick, electrically and thermally conductive material such as tungsten, for example, that prevents at least some post-processed substances such as residues or mischmetals from attaching to chamber wall 302. Sleeve 303 may also remain in solid form when subjected to the high operating temperatures inside furnace chamber 304.

Two or more electrodes 305 may be electrically connected to power supply 200 and form a closed circuit together with chamber wall 302. Electrodes 305 extend through enclosure 310 and insulating outer section 301 into chamber wall 302 and may seal furnace chamber 304 when so inserted. In some embodiments, the interior ends of electrodes 305 may be flat or flush with the interior of chamber wall 302, alternatively in other embodiments electrodes 305 may protrude into furnace chamber 304. For embodiments in which sleeve 303 may be present, the ends of electrodes 305 that are to be inserted inside chamber wall 302 may be tapered and may include threading that may be mated to threading in sleeve 303 as in the embodiment of FIG. 3 or to threading in chamber wall 302. Other means for fixing electrodes 305 to chamber wall 302 that can seal furnace chamber 304 and electrically and thermally connect electrodes 305 to chamber wall 302 for furnace operation such as for example an external locking mechanism may also be employed.

In some embodiments for which furnace chamber 304 is cylindrical, electrodes 305 may be shaped as tapered cylindrical endcaps although the invention is not limited in this respect. The shape of electrodes 305 may be configured to fit a different shape for furnace chamber 304 and corresponding different shape for chamber wall 302 as appropriate. Electrodes 305 may consist of graphite as is known in the art, possibly of the same composition as chamber wall 302. Other materials that can withstand the internal temperatures of furnace chamber 304 with no change of state or phase, are electrically conductive, and can internally sustain the formation of internal microplasma discharges may also be employed.

In some embodiments of the present invention subsequent to sealing furnace chamber 304, air inside furnace chamber 304 may be replaced or purged with an inert gas such as argon prior to operation to prevent undesirable chemical reactions such as for example oxidation, although the invention is not limited in this respect. For other embodiments, operation of the present invention may be sustainable without purging air inside the furnace chamber. Such purging to provide a non-reactive environment for melting and boiling of the desired precious metals and the equipment to accomplish it are well known in the art. To accomplish the replacement of air with an inert gas, inert gas supply tube 306 and gas discharge tube 308 may connected respectively to inert gas supply 320 and vacuum pump 321 as is known in the art. Supply valve 307 and discharge valve 309 may function respectively to isolate inert gas supply 320 and vacuum pump 321 respectively from furnace chamber 304 when the furnace chamber 304 is not being purged. The location, size, and shape of inert gas supply tube 306 and gas discharge tube 308 may vary according to the shape and size of furnace chamber 304. In some embodiments, inert gas supply tube 306 and gas discharge tube 308 may have a circular cross-section, thereby having a cylindrical form although the invention is not limited in this respect. Other tubular shapes are also possible. To replace or purge the air prior to operation, opening supply valve 307 may release a pressurized inert gas into furnace chamber 304. Opening discharge valve 309 may enable air to be exhausted from furnace chamber 304 by vacuum pump 321 when activated. Other purging systems as known in the art may also be employed.

In some embodiments, gas discharge tube 308 and vacuum pump 321 may also be used to remove carbon monoxide and carbon dioxide gas while the furnace is active. Such removal may be useful when coke is included with the initial material for the reduction or removal of oxygen from metal oxides.

Enclosure 310 may optionally surround insulating outer section 301 and may be sized to contain a sufficient quantity of insulating outer section 301 for proper operation of furnace 300 without significant radiative heat loss. Enclosure 310 may also provide additional thermal insulation. In some embodiments, the shape of enclosure 310 may conform to the shape of chamber wall 302, although the invention is not limited in this respect. For example, in one preferred embodiment having a cylindrical chamber wall 302, enclosure 310 may comprise fire-resistant bricks forming all six sides of a rectangular parallelepiped or alternatively five sides with the topside optionally open.

The temperature inside furnace chamber 304 may be maintained above the melting temperature of the desired metal or metals for a long enough duration to melt substantially or completely the desired metal or metals. Alternatively, the temperature inside furnace chamber 304 may be maintained above a highest melting temperature of the desired metals or reaction temperature if a catalyst or reducing agent is included with the substances inside furnace chamber 304 for a long enough duration to reduce all desired metals and form a mischmetal of these metals. Other reactions or separation techniques alone or in combination are also possible.

When separation is substantially complete, power supply 200 may be disengaged, and furnace 300 may be allowed to cool down. Alternatively, in some embodiments a cooling system for furnace 300 as known in the art may be used to accelerate the cool down of furnace 300. The desired metal or mischmetal may then be removed and mechanically separated from the slag or other residue remaining from the process. Other means for collecting the desired metal or mischmetal are also possible, such as for example, in a sump built into the bottom of furnace 300.

For further separation or extraction of metals, which may have been collected together in a mischmetal after the melting process, the mischmetal may be placed in a same or another furnace with the same features as furnace 300 with that furnace's electrodes also connected to a constant current power supply providing sufficient power to produce furnace chamber temperatures in excess of the boiling temperatures of the metals desired for separation or extraction. Such a furnace may further comprise other elements to facilitate the isolation of the vaporized metal or metals in a further separation or extraction process.

Using an embodiment of system 100, an experiment was conducted to extract iron from an ore comprising 18-22% iron. The extracted metallic material had an iron content of 97-98% as confirmed by scanning electron microscopic analysis. In this experiment, a coke, e.g., carbon, was used as a reducing agent. The current was in the range of 740-760 A and voltage was in the range of 14-8 V.

Figure 4:
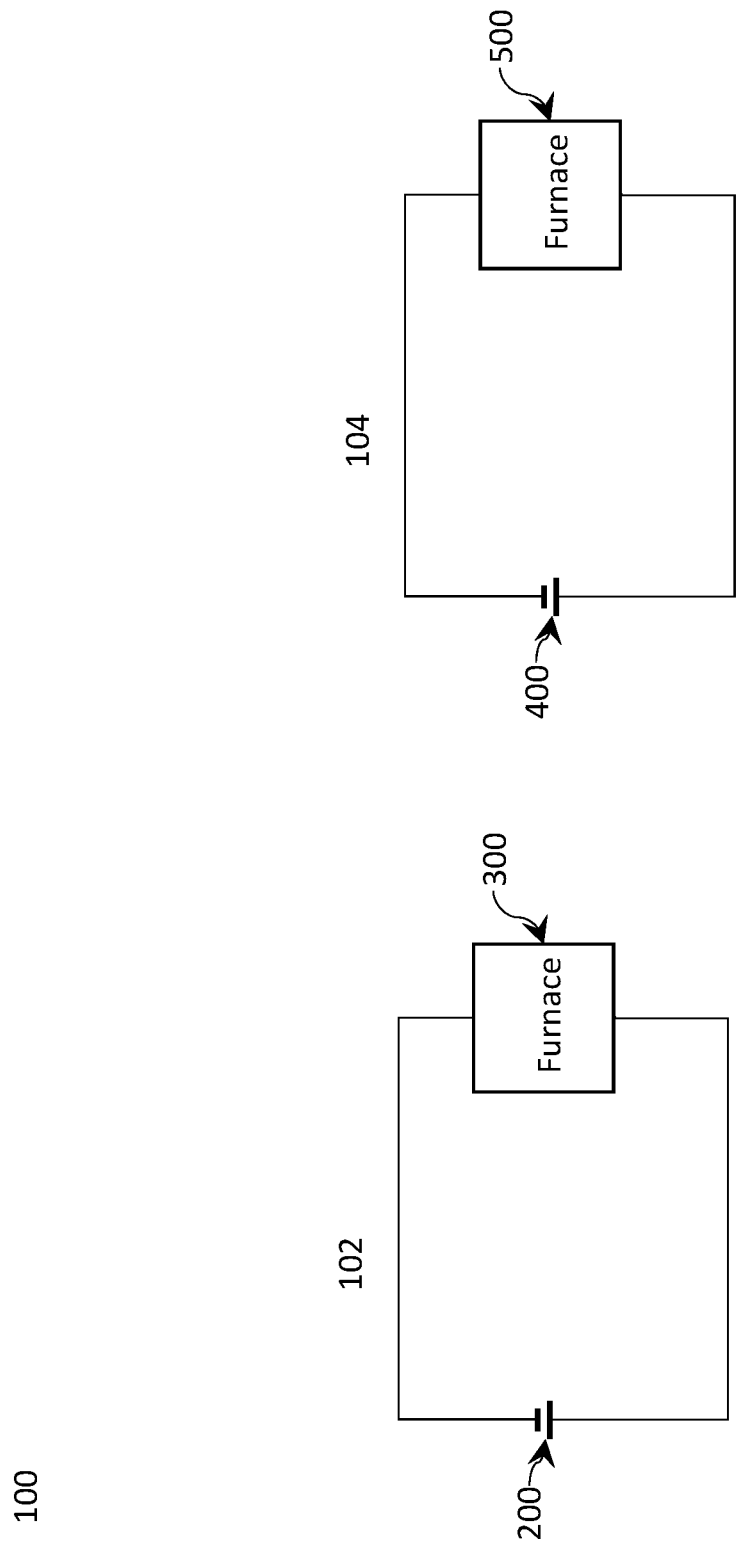
FIG. 4 is a circuit diagram of a system according to a further embodiment of the invention.

Reference is now made to FIG. 4 which shows an alternative preferred embodiment of the present invention in which system 100 further comprises circuit 104 including power supply 400 electrically connected to furnace 500. For the embodiment of FIG. 4, system 100 may function to extract one or more metals from a substance containing them using either circuit 102 alone or in combination with circuit 104. The elements of circuit 102 may be the same as or similar to those discussed herein with respect to FIGS. 2 and 3. However, the elements of circuit 104 may have some differences from those of circuit 102 according to its function as discussed below.

Power supply 400 may comprise a constant current power supply with a voltage current characteristic as illustrated in FIG. 2. However, in some embodiments the voltage and current levels of power supply 400 may differ from power supply 200 according to the different operating points of furnace 500. In further embodiments not depicted in FIG. 4, a single power supply may provide the functionality of power supplies 200 and 400 and may be electrically connected to furnaces 300 and 500 optionally with electrical switching to direct the electric current to the appropriate furnace for a given operation.

Figure 5:
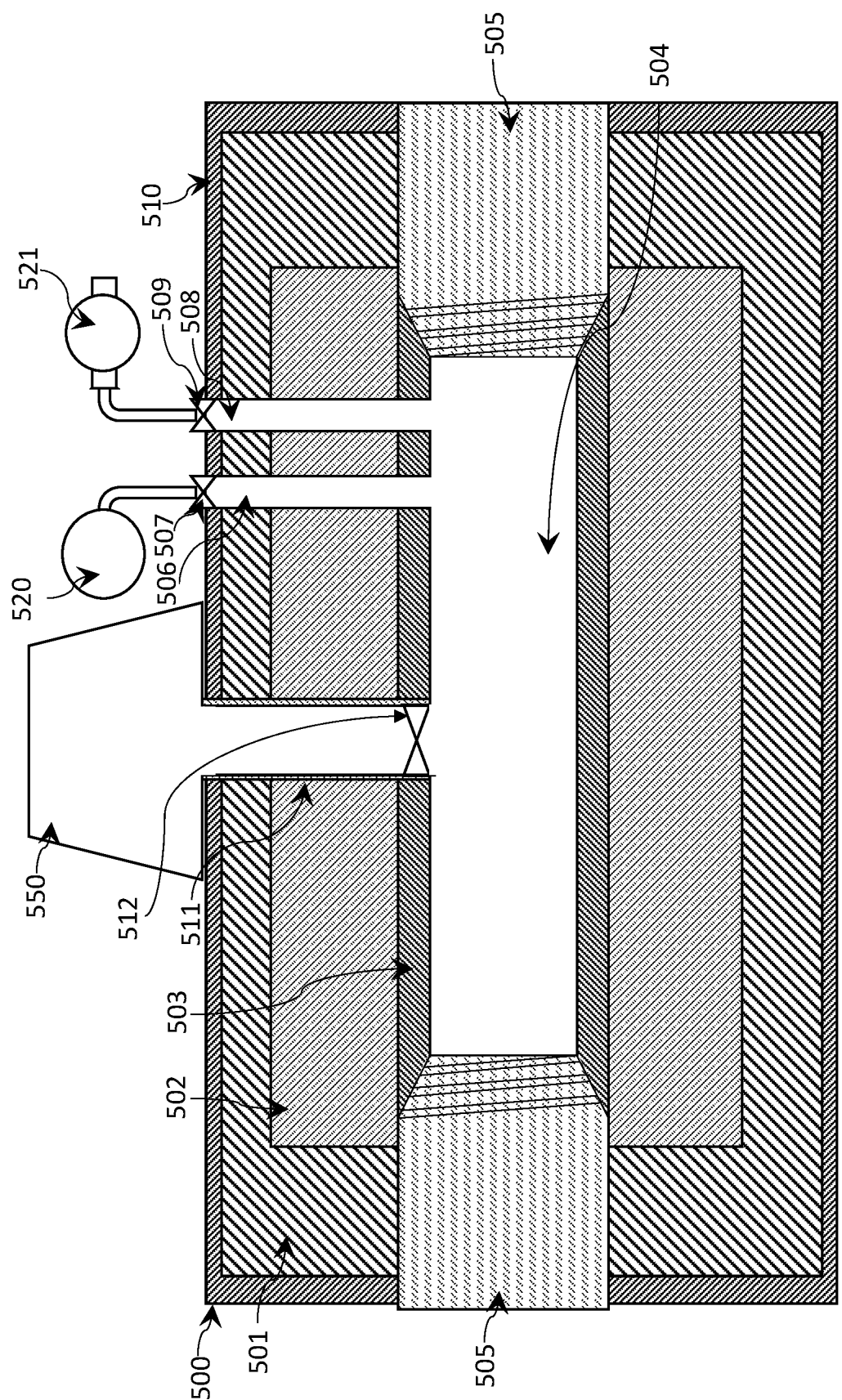
FIG. 5 shows a cross section of a furnace having an attached condensation unit according to an embodiment of the invention.

FIG. 5 shows a cross-section of furnace 500 for some embodiments of the present invention. Furnace 500 may comprise an insulating outer section 501 that surrounds chamber wall 502, sleeve 503, furnace chamber 504, electrodes 505, inert gas supply tube 506, inert gas supply valve 507, gas discharge tube 508, gas discharge valve 509, enclosure 510, inert gas supply 520, and vacuum pump 521. Furnace 500 may additionally comprise vaporization vent 511, vaporization valve 512, and condensation unit 550. Elements 501-510 and 520-521 may perform fundamentally the same functions as their counterparts 301-310 and 320-321 in furnace 300. However, the functionality and operating temperatures of furnace 500 may be different than that of furnace 300 with correspondingly different applied voltages and currents from power supply 400 applied to electrodes 505. Specifically, furnace 500 may be used to vaporize the desired metal or metals placed inside furnace chamber 504. In some of these embodiments for which the operating temperature inside furnace chamber 504 exceeds the melting point of sleeve 503, sleeve 503 may be removed or omitted from the construction of furnace 500. For example, for a sleeve 503 made of tungsten, operation to vaporize lanthanum would necessitate the removal or replacement of the tungsten sleeve 503 with one having a melting temperature higher than the boiling temperature of lanthanum, 3464° C., in furnace 500.

Figure 6:
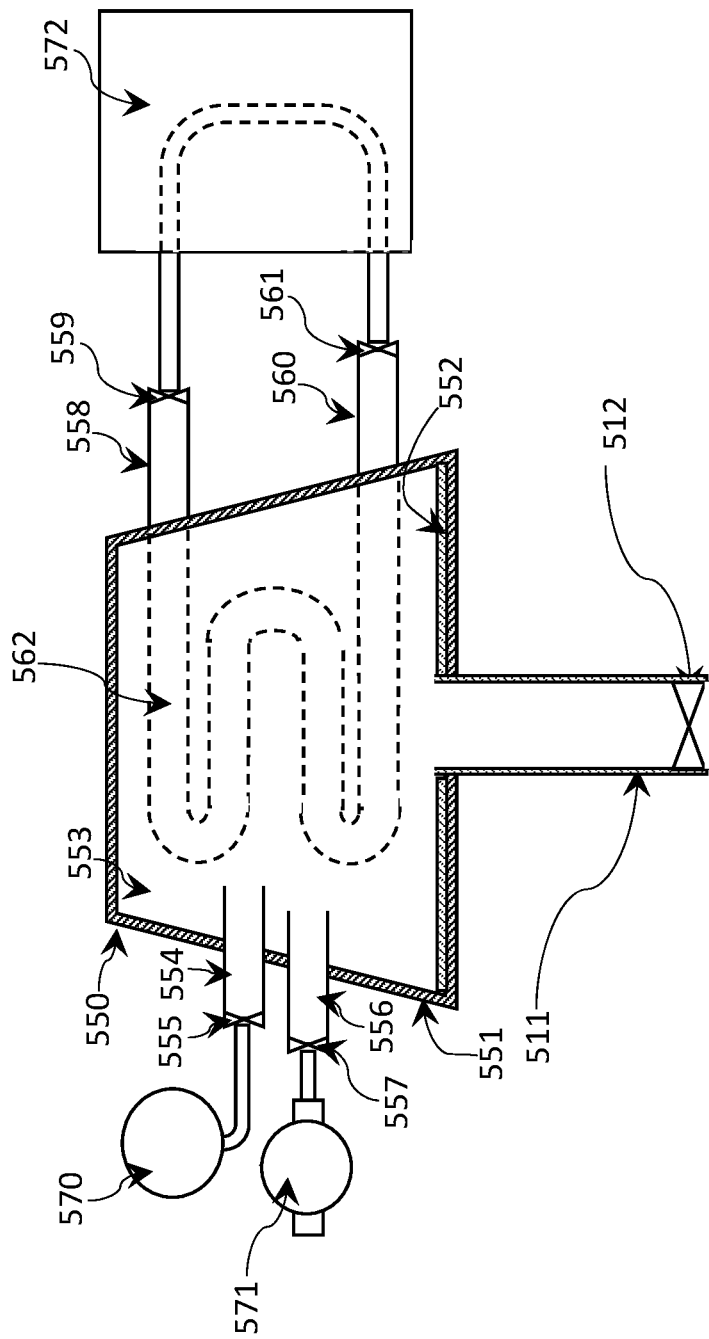
FIG. 6 shows a cross section of a condensation unit according to an embodiment of the invention.

FIG. 6 shows further details of condensation unit 550 as well as vaporization vent 511 and vaporization valve 512 according to some embodiments of the present invention. Condensation unit 550 may comprise condensation chamber wall 551, collection plate 552, condensation chamber 553, condensation chamber inert gas supply tube 554, condensation chamber inert gas supply valve 555, condensation chamber gas discharge tube 556, condensation chamber gas discharge valve 557, liquid coolant supply tube 558, liquid coolant supply valve 559, liquid coolant return tube 560, liquid coolant return valve 561, inert gas supply 570, vacuum pump 571 and cooling system 572.

Furnace 500 may operate at temperatures high enough for the desired metal or metals for extraction to evaporate. Vaporization vent 511 may comprise, for example, a graphite tube or other structure made from a solid material with a higher state change temperature than the highest boiling point of the metals to be extracted. In some embodiments, vaporization vent 511 may be embedded through insulating outer section 501, chamber wall 502, and sleeve 503 into furnace chamber 504 for allowing the vaporized metal gas to escape. Vaporization vent 511 may have a circular cross-section, thereby having a cylindrical form although the invention is not limited in this respect. Other tubular shapes with different cross-sections are also possible.

Depending on the operating state of furnace 500, vaporization valve 512 may function to isolate furnace chamber 504 from condensation unit 550 although the invention is not limited in this respect, other mechanisms may be used to isolate furnace chamber 504 from condensation unit 550.

The vaporized or gaseous metal may be captured and collected in condensation unit 550 which may be located above furnace chamber 504 and on top of insulating outer section 501 to allow vaporized metals to rise up through vaporization vent 511 and into condensation unit 550. Other locations relative to furnace chamber 504 are also possible. The condensation unit may, in some embodiments, be positioned outside enclosure 510. In some preferred embodiments the shape of condensation unit 550 and correspondingly condensation chamber wall 551 may be a frustum or similar shape with a wider base and tapered in the vertical direction. This tapering may serve to facilitate condensation of metal gas and collection on collection plate 552. In some preferred embodiments, condensation chamber wall 551 may be fabricated from copper although the invention is not limited in this respect. Other thermally conductive materials capable of withstanding the temperatures inside condensation chamber 553 may also be used.

Collection plate 552 may be configured to match the shape of the bottom of condensation unit 550 and may rest on or be fixed to the bottom surface of condensation chamber wall 551. In some embodiments, condensation unit 550 may be separable into two or more parts to allow isolation and sealing of, access to, and possibly removal of collection plate 552 for the purpose of collecting the condensed metal that may have accumulated in or on collection plate 552 during operation of furnace 500. Other devices for collecting the condensed metal that can be separated from condensation unit 550 and sealing the collected metal under pressure with an inert gas may also be used.

In some preferred embodiments, inert gas supply 570, condensation chamber inert gas supply tube 554, vacuum pump 571 and condensation chamber gas discharge tube 556 may operate similarly to inert gas supply 320, inert gas supply tube 306, vacuum pump 321, and gas discharge tube 308 for use in replacing or purging air prior to operation of condensation unit 550. Furthermore, because the functionality of condensation chamber 550's purging system may be similar to that of furnace chamber 500's, some embodiments of the present invention may function adequately with only one of these two purging systems present in those embodiments.

To facilitate the condensation process, condensation unit 550 may include a fluid filled cooling tube 562 as is known with liquid supply tube 558 and liquid coolant return tube 560 as the input and output for the cooling fluid. Liquid coolant supply valve 559 and liquid coolant return valve 561 may act to isolate cooling tube 562 from cooling system 572. For some embodiments, cooling tube 562 may comprise one or more tubes embedded in condensation chamber wall 551 or on the surface of condensation chamber wall 551 as is known in the art. In a preferred embodiment, the coolant supplied by cooling system 572 may be liquid nitrogen, although other coolants known in the art may also be used.

The functionality of furnaces 300 and 500 may also be accomplished in a single furnace for some embodiments. In these instances, the sealing of furnace 500 may be accomplished by closing vaporization valve 512 or sealing vaporization vent 511 with a mechanical cover, made from a substance with an appropriately high melting point, thereby isolating chamber 503 from condensation unit 550 and preventing release of gas through vaporization vent 511. Furthermore, in instances where more than one precious metal is to be extracted from a mischmetal, vaporization valve 512 may be closed after collection of a first precious metal having the lowest boiling point of the precious metals present in the mischmetal from condensation unit 550 prior to raising the temperature inside furnace chamber 504 to an intermediate temperature for a second precious metal having the second lowest boiling point. It may also be desirable to reduce the temperature inside furnace chamber 504 to allow for safe handling or collection of each precious metal from condensation unit 550 before raising the temperature for collection of the next metal.

In some embodiments, furnace 500 may comprise multiple sets of condensation unit 550, vaporization vent 511, and vaporization valve 512. For these embodiments, furnace 500 may be operated to extract two or more precious metals by vaporization from a mischmetal or other material comprising two or more precious metals. A first condensation unit 550 may be used to collect a first desired precious metal by raising the temperature inside furnace chamber 504 to an intermediate temperature above the lowest boiling point of the precious metals to be extracted. A first vaporization valve 512 may be opened to allow the vaporized desired precious metal to enter the first condensation unit 550 and may remain open until substantially all of the first desired precious metal has been vaporized and collected. The first vaporization valve 512 may then be closed and the temperature inside furnace chamber 504 may be raised to an intermediate temperature above the boiling point of a second desired precious metal having the second lowest boiling point. A second vaporization valve 512 corresponding to a second condensation unit 550 may then be opened to allow the vaporized second desired precious metal to enter the second condensation unit 550 and may remain open until substantially all of the second desired precious metal has been vaporized and collected. The second vaporization valve 512 may then be closed. This process of heating, opening a vaporization valve, collecting a vaporized precious metal, and closing a vaporization valve may be repeated for as many precious metals as may be present in the mischmetal or for as many to be extracted. For these embodiments, furnace 500 may comprise as many condensation chambers 553 as there are precious metals to be extracted. In alternative embodiments, only two condensation chambers 553 may be present with each chamber's vaporization valves 522 being alternately opened and closed according to the sequencing of precious metals to be extracted.

In other embodiments with a single condensation chamber, multiple collection plates 552 may be used such that each collection plate 552 may be replaced sequentially after the extraction of a given metal in a sequence of metals to be extracted. A separate mechanism that seals and isolates collection plate 552, possibly under pressure with an inert gas, to prevent contamination by atmospheric contact with the extracted metal may also be included. Such mechanisms are known in the art.

Figure 7:
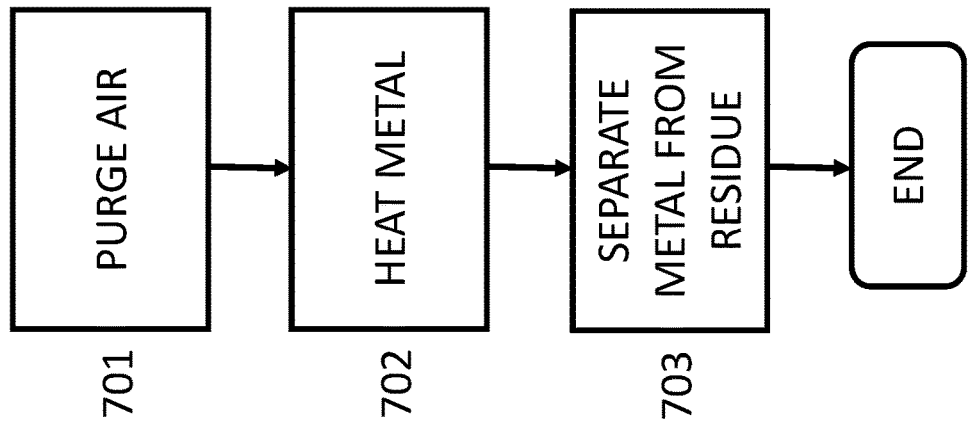
FIG. 7 is a flowchart of a method for separating precious and other metals according to an embodiment of the invention.

Reference is now made to FIG. 7, which shows a method for separating one or more metals from a material according to a preferred embodiment of the invention. Embodiments of the method may be used by, or may be implemented by, for example, system 100 employing the elements of circuit 102.

It is assumed that the initial operations to place the metal containing material in furnace 300 and the sealing of furnace 300 have already been performed. In some embodiments, additional substances such as for example a coke with a high carbon content or other reducing agent or a catalyst may also be placed into furnace 300 along with the metal containing material to facilitate a chemical reaction such as reduction or other process during operation of furnace 300. For these redox reactions, the temperature at which the reaction occurs may be lower than the melting or boiling temperature of the metal oxide or oxides being reduced.

In operation 701, inert gas supply valve 307 and gas discharge valve 309 may be opened and inert gas supply 320 and vacuum pump 321 activated to allow an inert gas to enter furnace chamber 304 and replace the air inside with the inert gas. These valves are then closed for execution of the next operation. In some alternative embodiments, the functionality of furnace 300's purging system may be reproduced alternatively by the purging system of furnace 500 or by that of condensation chamber 550 of furnace 500. For this second alternative embodiment, vaporization valve 512 may also be opened and then closed for the remaining operations which then may proceed using the corresponding parts of furnace 500. In other alternative embodiments, the presence of air in furnace chamber 504 may not significantly affect the desired process such that operation 701 may be omitted.

For operation 702, power supply 200 may be activated to apply a current to electrodes 305. The current may flow through electrodes 305 and chamber wall 302 thereby forming microplasma discharges within electrodes 305 and chamber wall 302 and consequently heating furnace chamber 304 through resistive heating and possibly other heating processes. Unlike in plasma arc furnaces for example, no arc discharge in the interior of furnace chamber 504 may be required for the functioning of the present invention. In embodiments for which power supply 200 supplies an alternating current, inductive heating may contribute to the heating of the contents of furnace chamber 304. The voltage and current settings for power supply 200 are determined by a number of different parameters including, but not limited to the melting temperature or temperatures of the metal or metals to be separated from the material, the size and shape of furnace chamber 304, and the type and amount of substance or substances placed inside furnace chamber 304. Alternatively or additionally, the reaction temperature of a chemical process such as reduction may be a determining factor of the voltage and current settings for power supply 200. Specifically, the internal temperature of furnace chamber 304 may be raised sufficiently high and for sufficient duration to melt substantially all of the metal or metals in furnace chamber 304 or to allow one or more other reactions such as a reduction process or other processes inside furnace chamber to be substantially complete.

Once substantially all of the desired metal has been melted or other desired reactions are complete, power supply 200 is turned off allowing the metal or metals to cool and congeal. Furnace 300 may be unsealed or opened, and the metal may then be physically or mechanically separated from the residue or slag remaining from the material in operation 703. In one embodiment of the invention, physically isolating the metal from any residue can be accomplished by hand after removing the residue and metal from furnace chamber 304 although the invention is not limited in this respect. A mechanism or other device may also be employed to isolate the metal from the residue either inside furnace chamber 304 or upon removal from furnace chamber 304. In some embodiments, after cooling and prior to opening, furnace 300 may be placed in a glove box or similar device as is known in the art for isolating its contents from the air. The removal and separation of the residue or slag from the material may then be accomplished without risking contamination of the desired material. In other embodiments, isolation of metal from residue may occur inside furnace chamber 304, possibly during operation 702 by means for example of a sump or other collection mechanism.

Figure 8:
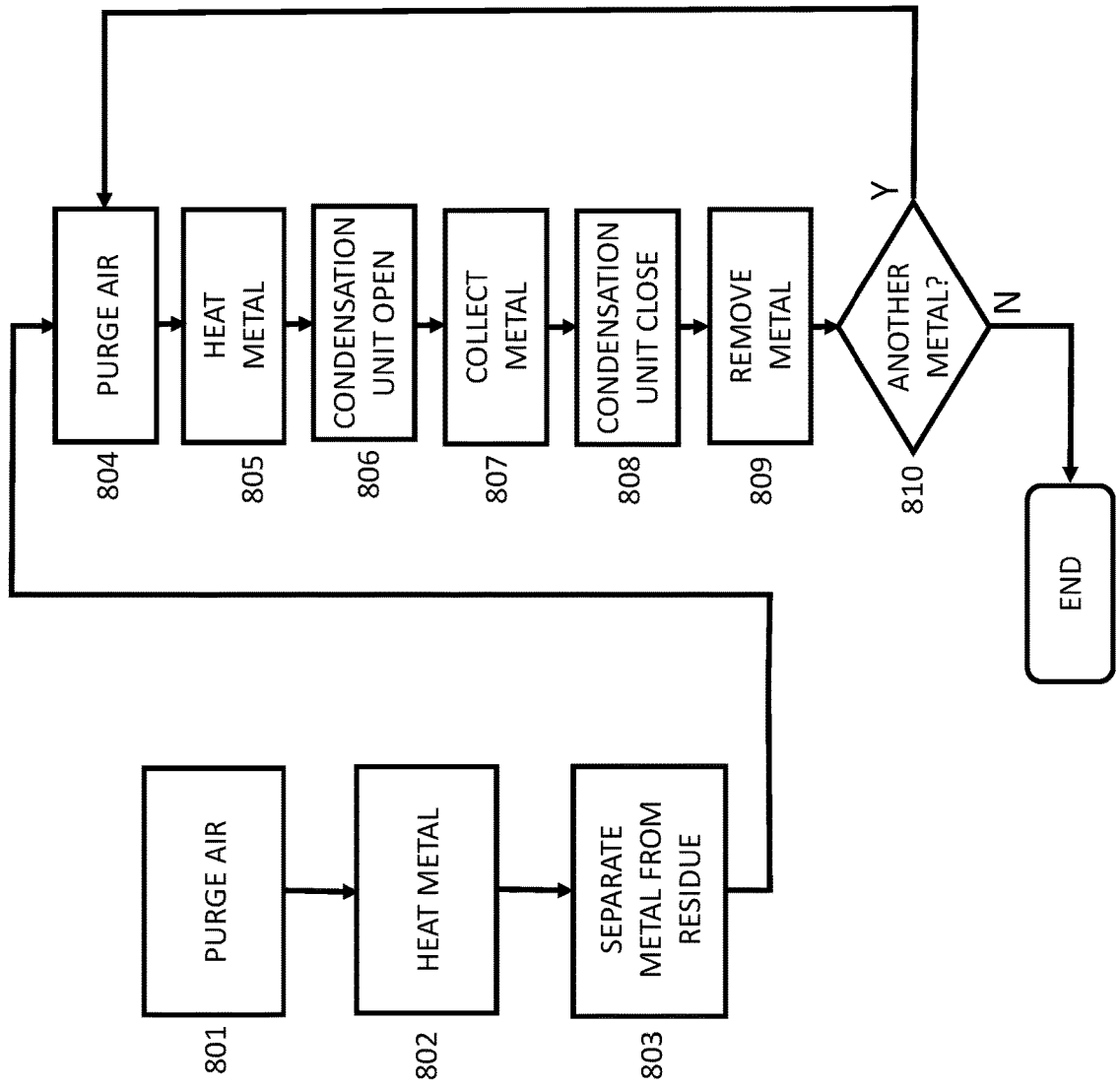
FIG. 8 is a flowchart of a method for separating and extracting precious and other metals according to an embodiment of the invention.

Reference is now made to FIG. 8, which shows a method for extracting two or more metals from a material according to a preferred embodiment of the invention. Embodiments of the method may be used by, or may be implemented by, for example, metal extraction system 100 employing the elements of circuit 102, elements of circuit 104, some combination of the elements of circuits 102 and 104, or other suitable systems.

Operations 801, 802, and 803 may proceed as in the analogous operations 701, 702 and 703 of the method shown in FIG. 7 with the substances placed in furnace 300 and power supply 200 activated. However, the product from operation 803 may be a mischmetal containing two or metals for extraction. It is assumed that upon separation from any residue and removal from furnace 300, this mischmetal is transferred to and placed in furnace 500. In some embodiments, additional substances may be placed inside furnace 500 to facilitate the extraction process.

In operation 804, inert gas supply valve 507 and gas discharge valve 509 may be opened and inert gas supply 520 and vacuum pump 521 activated to allow an inert gas to enter furnace chamber 504 and replace the air inside with the inert gas. Additionally, condensation chamber inert gas supply tube 554 and condensation chamber gas discharge tube 556 may be opened and inert gas supply 570 and vacuum pump 571 activated so that the air inside condensation chamber 553 may also be replaced. Alternatively, the purging system of condensation unit 550 may provide the same functionality for both condensation chamber 553 and furnace chamber 504 with vaporization valve 512 opened prior to purging the air inside furnace chamber 504.

In operation 805, power supply 400 may be activated to apply a constant current to electrodes 505 of sufficient level to raise the temperature inside furnace chamber 504 to an intermediate temperature above the lowest boiling temperature of the two or more metals to be extracted. Maintaining the temperature at or near this first intermediate temperature may prevent the inadvertent extraction of other metals with higher boiling temperatures still present in the mischmetal. Vaporization valve 512 may next be opened in operation 806 and this first metal may be collected on collection plate 552 or other comparable device after it vaporizes in furnace chamber 504 and rises into condensation chamber 553 during operation 807. During operation 807, the activation of cooling system 572 and the opening of liquid coolant supply valve 559 and liquid coolant return valve 561 acts to facilitate the condensation of the vaporized metal in condensation unit 550. The heating of operation 805 and the metal collection of operation 807 may continue simultaneously until substantially all of the first metal has vaporized and been collected on collection plate 552 such that the purity or fineness of the second and other metals to be collected at higher temperatures may be above a desired level and not be reduced by any residual presence of the first metal being extracted.

In operation 808, vaporization valve 512 is closed, cooling system 572 is deactivated with liquid coolant supply and return valves 559 and 561 closed. At this point, the first metal may be removed from condensation unit 550 in operation 809. In some embodiments, furnace 500 may be cooled prior to operation 809. Furthermore, removal may be accomplished by opening condensation unit 550 and removing and replacing collection plate 552 with another collection plate 552 or by other means as are known in the art. In some embodiments, collection plate 552 may be sealed under pressure from an inert gas prior to its removal from condensation unit 550. In further embodiments, collection plate 552 may placed inside a glove box to facilitate the removal of its contents without atmospheric contamination.

After the removal of collection plate 552, the process proceeds to operation 810. If there is no additional metal to be extracted, the process ends. If there is one or more additional metal to be extracted, the method may revert back to operation 804 with the purging of condensation chamber 553 and subsequently power supply 400 being configured to apply to electrodes 504 a higher power level to raise the temperature inside furnace chamber 503 to an intermediate temperature above the boiling point of the next metal to be extracted. Operations 804 through 810 may proceed until substantially all of the metals to be extracted have been vaporized and collected with the final temperature inside furnace chamber 503 set to a temperature above the boiling point of the last metal to be extracted.

For embodiments with multiple condensation units 550, the vaporization valve 512 associated with each condensation unit 550 may be used sequentially one at time to open the respective condensation unit 550 for the escaping metal vapor to condense and be collected. The multiple condensation units 550 may then be employed to collect two or more different metals from a single sample of mischmetal by sequentially opening closing the vaporization valves 512 associated with the multiple condensation units 550.

In yet other embodiments for the separation of a metal with a higher boiling point than the other substances comprising the input material, such as for example platinum with a boiling temperature of 3825° C., the operations portrayed in FIG. 8 may be used as a single non-iterative process wherein the temperature of furnace chamber 503 is raised to a temperature above the boiling points of all or nearly all of the other substances present in the input material. Condensation unit 550 may then be used to collect these vaporized substances, leaving the desired metal with the higher boiling point remaining in furnace chamber 503 after all the operations have been completed.

Alternatively, if two or more desired metals are present in the input material and the other substances comprising the input material, i.e., impurities, have boiling temperatures below the lowest boiling temperature of the desired metals, the operations portrayed in FIG. 8 may take place in multiple iterations in which the first iteration removes the impurities, and subsequent iterations extract each individual metal.

Other operations or series of operations may be used.

While the invention has been described with respect to a limited number of embodiments, it will be appreciated that many variations, modifications, and other applications of the invention may be made. Embodiments of the present invention may include other apparatuses for performing the operations herein. Such apparatuses may integrate the elements discussed or may comprise alternative components to carry out the same purpose. It will be appreciated by persons skilled in the art that the appended claims are intended to cover all such modifications and changes as fall within the true spirit of the invention.

What is claimed is:

1. A system for separating one or more metals from within a substance comprising one or more metals, the system comprising:
    a constant current power supply configured to produce a current of constant magnitude over a range of voltage and having a short circuit current, and for which the short circuit current is limited to avoid damage to the power supply, and
    a furnace having a chamber for containing the substance comprising one or more metals, the furnace comprising an insulating outer section, a chamber wall electrically and thermally conductive for resistively heating the chamber in the presence of an electric current flowing through the chamber wall, and two electrodes electrically coupled to the constant current power supply and mechanically, electrically, and thermally connected to the chamber wall,
    wherein the chamber wall has an open-ended annular shape and the two electrodes are endcaps of the open-ended annular shape such that electricity from the constant current power supply flows from the electrodes to the chamber wall, and
    wherein each of the chamber wall and the two electrodes are comprised of graphite having an anisotropic structure, and the constant current power supply is configured to provide power to achieve an operating temperature above a highest melting temperature of the one or more metals for a duration to melt all of the one or more metals inside the chamber.

2. The system of claim 1 wherein the furnace is further comprised of an inert gas purging system for purging air from the chamber.

3. The system of claim 2 wherein the interior of the chamber wall is lined with tungsten.

4. The system of claim 3 wherein the constant current power supply is an alternating current constant current power supply.

5. The system of claim 4 wherein the substance comprising one or more metals comprises one or more metal oxides, the chamber is for containing the substance comprising one or more metals and a reducing agent, and the power supply configured to provide power to achieve an operating temperature above a reaction temperature for reduction of the one or more metals inside the chamber for a duration such that reduction is completed.

6. The system of claim 1 further configured for extracting two or more metals from a substance comprising two or more metals, the system further comprising:
    a condensation unit attached to the chamber wall for condensing and collecting the two or more metals in vaporized gas form,
    and a venting tube connecting the chamber of the furnace to the inside of the condensation unit for directing vaporized metal to the condensation unit,
    wherein the constant current power supply is further configured to provide power to achieve a temperature above a highest boiling temperature of the two or more metals for a duration to vaporize all of the two or more metals inside the chamber.

7. The system of claim 6 wherein the power supply is further configured to provide power at one or more intermediate temperatures above a boiling temperature of at least one of the two or more metals for duration to vaporize individually at least one of the two or more metals.

8. The system of claim 7 wherein the condensation unit comprises a condensation chamber, the venting tube connects the furnace chamber to the condensation chamber, an inert gas purging system for purging air from the condensation chamber and the furnace chamber, a liquid cooling system, and a collection device for collecting condensed metals connected to the condensation chamber.

9. The system of claim 8 wherein the condensation unit is configured for replacing the collection device after collection of a first metal.

10. The system of claim 9 wherein the substance comprising two or more metals is a mischmetal of precious metals.

11. The system of claim 10 wherein the system comprises two or more condensation units.

12. The system of claim 11 wherein the constant current power supply is an alternating current constant current power supply.

13. A method for separating one or more metals from within a substance comprising one or more metals, the method comprising:
    placing the substance inside a chamber of a furnace, the furnace comprising an insulating outer section, a chamber wall electrically and thermally conductive for resistively heating the chamber in the presence of an electric current flowing through the material of the chamber wall, and two electrodes mechanically, electrically, and thermally connected to the chamber wall, and
    supplying an electric current from a constant current power supply electrically coupled to the two electrodes at a power level to raise an operating temperature inside the chamber above a highest melting temperature of the one or more metals inside the chamber and for a duration long enough to melt all of the one or more metals, the constant current power supply configured to produce a current of constant magnitude over a range of voltage and having a short circuit current, and for which the short circuit current is limited to avoid damage to the power supply, wherein the chamber wall has an open-ended annular shape and the two electrodes are endcaps of the open-ended annular shape such that electricity from the constant current power supply flows from the electrodes to the chamber wall, and wherein each of the chamber wall and the two electrodes are comprised of graphite having an anisotropic structure.

14. The method of claim 13 wherein the furnace further comprises an inert gas purging system for purging air from the chamber and the method further comprises the step of purging air from the chamber prior to supplying the electric current from the alternating current constant current power supply.

15. The method of claim 13 wherein the constant current power supply is an alternating current constant current power supply.

16. The method of claim 15 wherein the one or more metals are precious metals and a product of said applying current is a mischmetal if the substance comprising the one or more metals comprises two or more precious metals.

17. The method of claim 16 wherein the substance comprising one or metals comprises one or more metal oxides, the placing the material step further comprises placing a reducing agent inside the chamber, the operating temperature in the supplying an electric current step is above a reaction temperature for reduction of the one or more metals inside the chamber, and the constant current power supply is configured to supply power for a duration to complete the reduction of all of the one or more metal oxides.

18. The method of claim 17 wherein an amount of the reducing agent is stoichiometrically determined by the one or more precious metals is placed inside the chamber.

19. A method of extracting two or more metals from within a substance comprising two or more metals to be collected, the method comprising:

placing the substance inside a chamber of a furnace, the furnace comprising an insulating outer section, a chamber wall electrically and thermally conductive for resistively heating the furnace chamber in the presence of an electric current flowing through the material of the furnace chamber wall, two electrodes mechanically, electrically and thermally connected to the furnace chamber wall, a condensation unit for condensing and collecting vaporized metals, the condensation unit comprising a condensation chamber, an inert gas purging system for purging air from the condensation chamber and the furnace chamber, a liquid cooling system, and a collection device for collecting condensed metals connected to the condensation chamber, and a venting tube connecting the furnace chamber to the condensation chamber of the condensation unit, purging air from the furnace chamber, supplying an electric current from a constant current power supply, the constant current power supply electrically coupled to the two electrodes, at a power level to raise an operating temperature inside the furnace chamber to an intermediate temperature above a lowest boiling temperature of a first metal to be collected and for a duration to vaporize all of the first metal, the constant current power supply configured to produce a current of constant magnitude over a range of voltage and having a short circuit current, and for which the short circuit current is limited to avoid damage to the power supply, and collecting the first metal in the collection device of the condensation unit, wherein the chamber wall has an open-ended annular shape and the two electrodes are endcaps of the open-ended annular shape such that electricity from the constant current power supply flows from the electrodes to the chamber wall, and wherein each of the chamber wall and the two electrodes are comprised of graphite having an anisotropic structure.

20. The method of claim 19 wherein the substance comprising two or metals to be collected is a mischmetal of precious metals.

21. The method of claim 20 wherein the constant current power supply is an alternating current constant current power supply.

22. The method of claim 21, further comprising the steps of:

removing the first metal from the collection device of the condensation unit, supplying electric current to raise the operating temperature inside the furnace chamber to above a boiling temperature of a second metal to be collected, and collecting the second metal in the collection device of the condensation unit, wherein the constant current power supply is further configured to produce currents of two or more constant magnitudes over a range of voltage at two or more power levels to raise the operating temperature inside the furnace chamber to two or more temperatures and for durations to vaporize individually at least two of the two or more metals, and wherein at least one of the two or more temperatures is an intermediate temperature above the boiling temperature of the first metal to be collected.

23. The method of claim 22, further repeating said removing step, said supplying electric current step, and said collecting step for any remaining metals in the substance comprising two or more metals to be collected, wherein for a last metal to be collected said supplying electric current step supplies electric current at a power level to raise the operating temperature inside the furnace chamber to a temperature above a boiling point of a last metal to be collected and for a duration to vaporize all of the last metal to be collected.

24. The method of claim 23 wherein the furnace comprises a first condensation unit for condensing and collecting the first metal and a second condensation unit for condensing and collecting the second metal, and further comprising the steps of:

removing the first metal from a collection device of the first condensation unit, supplying electric current to raise the operating temperature inside the furnace chamber to an intermediate temperature above a boiling temperature of the second metal to be collected and for a duration to vaporize all of the second metal to be collected, and collecting the second metal in a collection device of the second condensation unit.

\* \* \* \* \*